Feb. 20, 1962 E. L. SCHLAGE 3,021,734
BORING JIG
Filed Dec. 1, 1958 4 Sheets-Sheet 1
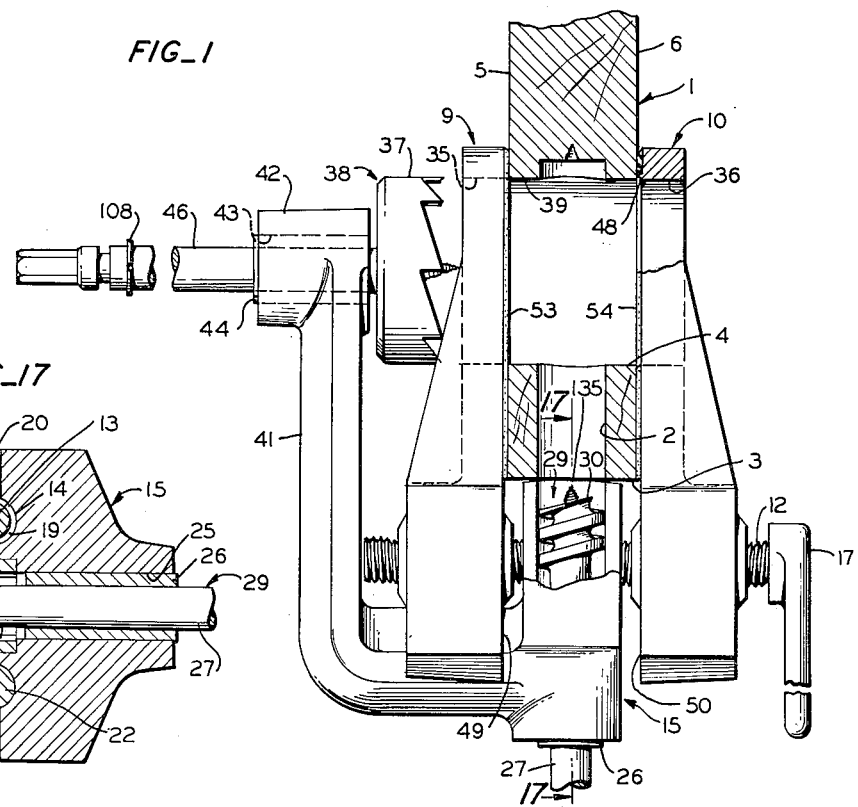
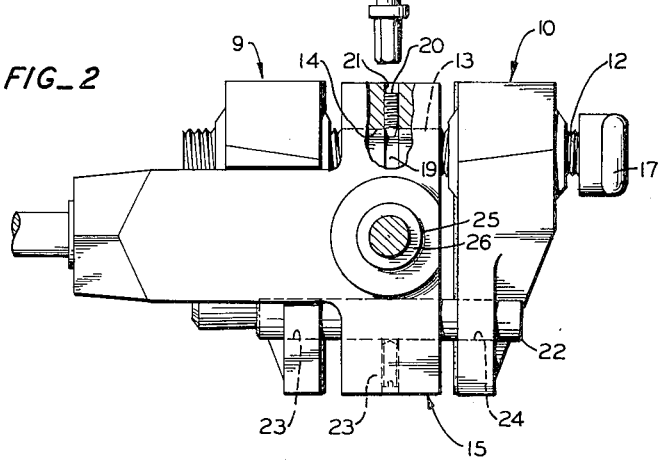
INVENTOR.
ERNEST L. SCHLAGE
BY
Boyken, Mohler & Wood
ATTORNEYS

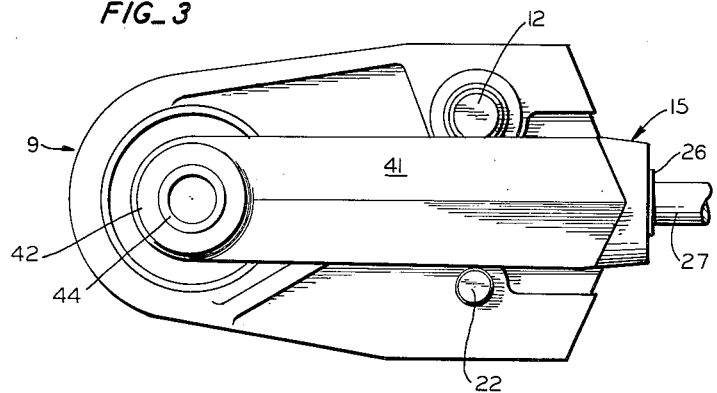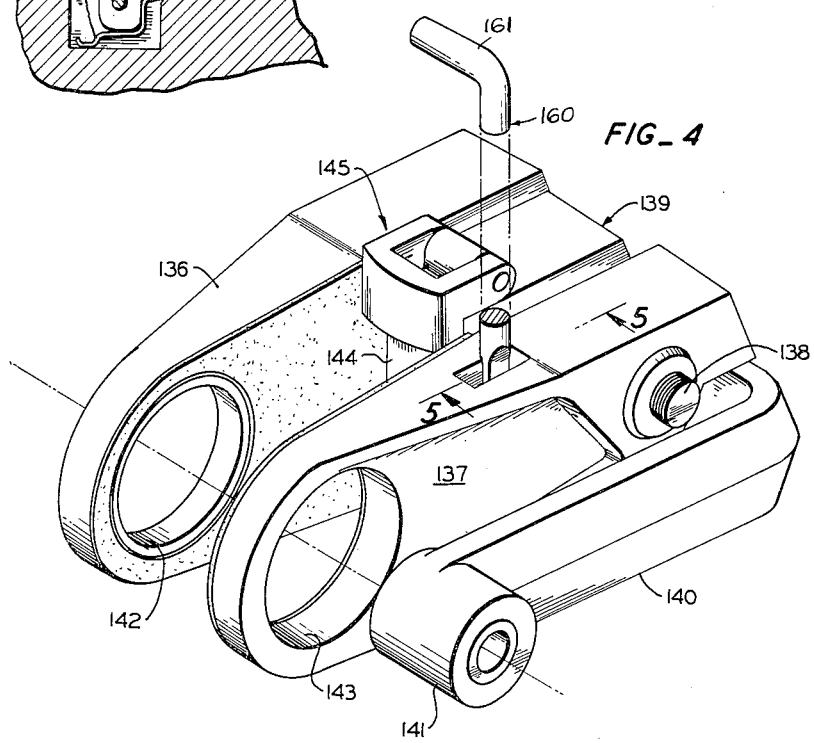

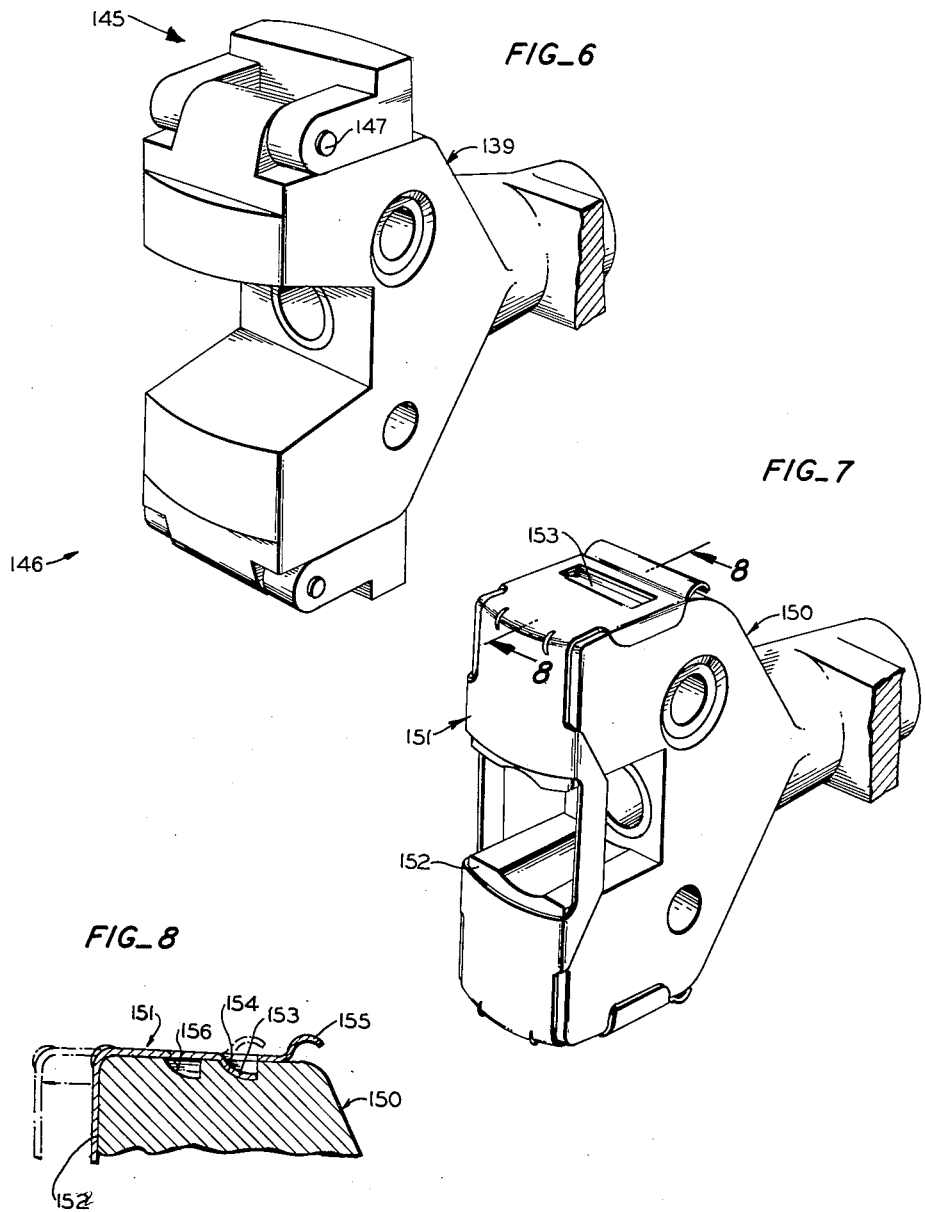

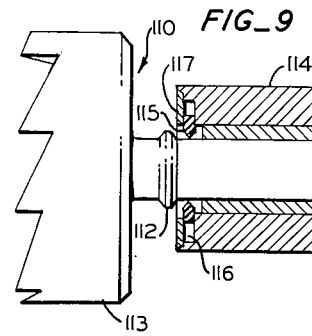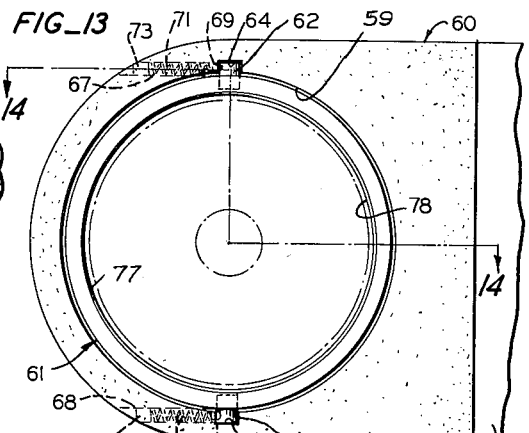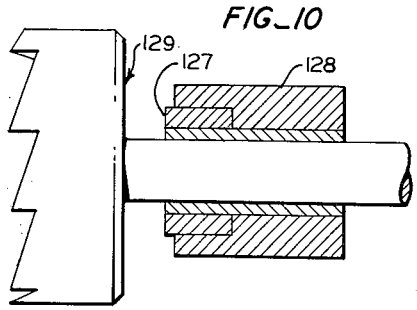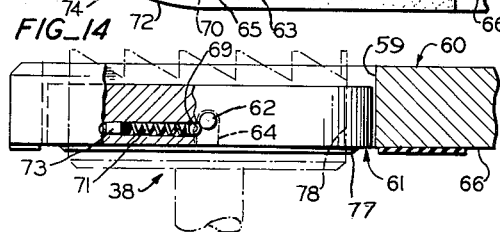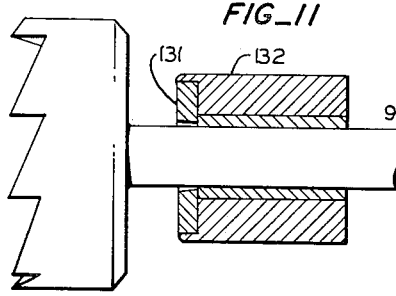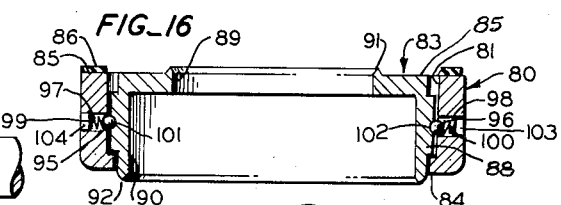

United States Patent Office 3,021,734
Patented Feb. 20, 1962

3,021,734
BORING JIG
Ernest L. Schlage, Burlingame, Calif., assignor to Schlage Lock Company, a corporation
Filed Dec. 1, 1958, Ser. No. 777,515
8 Claims. (Cl. 77—62)

This invention relates to a boring jig and particularly a boring jig adapted for use in boring the holes necessary for the reception of a cylindrical lock in a door.

For the installation of a cylindrical lock it is necessary to bore one hole from the side edge of the door and a somewhat larger diameter hole between the opposite faces of the door in intersecting relation to the first hole. To provide for optimum accuracy in installing the lock it is desirable that the axes of said holes be coplanar and intersect exactly at right angles.

Heretofore, boring jigs have been provided with means for detachably securing them to a door and provided with guide means for guiding a boring bit during the boring operation. However, because of the adjustable nature of such jigs, prior art devices of this nature have not provided the most accurate positioning of the axes of the bored holes.

It is therefore the main object of this invention to provide a boring jig for the above noted purpose that insures accurate positioning of the bored holes.

Another object of the invention is the provision of a boring jig adapted for use in boring the two holes to receive a cylindrical lock and which jig includes means for preventing splintering of the door as the boring bit emerges from the door.

Still another object of the invention is the provision of a boring jig that lends itself to use with power means for driving the boring bits and which permits successive attachment of the power means to both boring bits quickly and accurately.

Yet another object of the invention is the provision of a boring jig that is adapted for use in preparing doors for installation of cylindrical locks having different backsets.

Other objects and advantages of the invention will be apparent from the following specification and the drawings:

FIG. 1 is a horizontal cross section through a portion of a door showing the boring bit of the present invention in elevation with portions thereof broken away and in section.

FIG. 2 is an end elevation of the boring jig of FIG. 1.

FIG. 3 is a side elevation of the boring jig of FIG. 1.

FIG. 4 is a perspective of one form of the boring jig.

FIG. 5 is a vertical section of a portion of the boring jig as taken along lines 5—5 of FIG. 4 showing one method of attaching the height line rod.

FIG. 6 is a perspective of a portion of the jaw support showing one means for adapting the device to use with different backsets.

FIG. 7 is a perspective of a portion of the jaw support showing another adjustable backset means.

FIG. 8 is a cross section of the adjustable backset means of FIG. 7, as taken along lines 8—8 of FIG. 7.

FIG. 9 is a section through the bit stem guide showing one means for holding the bit in its inoperative position.

FIG. 10 is a section through the bit stem guide showing another means for holding the bit in inoperative position.

FIG. 11 is a section through the bit stem guide showing another means for holding the bit in inoperative position.

FIG. 12 is a section through the bit stem guide showing another means for holding the bit in inoperative position.

FIG. 13 is a side elevation of a clamping jaw showing a swingably mounted door engaging element thereon.

FIG. 14 is a top plan view of the element of FIG. 13.

FIG. 15 is a side elevation of another form of the door engaging element.

FIG. 16 is a horizontal cross section of the door engaging element as taken along lines 16—16 of FIG. 15.

FIG. 17 is a vertical cross section of the clamp support as taken along lines 17—17 of FIG. 1.

In detail, and with reference to FIGS. 1–4, the invention is adapted to be employed with a door generally designated 1 (FIG. 1) and is designed to assist in boring a hole 2 from the side edge 3 of the door 1 and a hole 4 extending between the opposite faces 5, 6 of the door.

The invention comprises a pair of clamping jaws generally designated 9, 10 which are adapted to engage the opposite faces 5, 6 respectively of the door 1 as seen in FIG. 1. Said jaws are provided with threaded apertures through which extends a threaded stud 12.

Stud 12 is provided with an unthreaded central portion 13 (FIG. 2) rotatably received in a bore 14 extending transversely through a jaw support member or block generally designated 15. The end of stud 12 adjacent jaw 10 is provided with an elongated handle 17 for rotating stud 12, and the opposite ends of stud 12 are provided with right and left hand threads respectively. Since the central portion 13 of stud 12 is rotatable in jaw support 15 it will be apparent that the jaws 9, 10 will move toward support 15 upon rotation of stud 12 in one direction and move away from support 15 upon rotation of said stud in the opposite direction. In order to retain stud 12 within support 15 and still permit it to rotate, a peripherally extending groove 19 is formed in said central portion 13 and a pin 20 or a set screw is secured within a hole 21 so as to enter groove 19. In this manner rotation of stud 12 is not affected but endwise withdrawal of stud 12 from support 15 is prevented.

To provide additional stability for jaws 9, 10 during their movement toward and away from each other an elongated rod 22 (FIG. 2) is received within a suitable bore in support 15 and secured therein in any convenient manner such as by set screw 23 (FIGS. 2, 17). The ends of rod 22 project oppositely outwardly from support 15 and are slidably received in transversely extending holes 23, 24 formed in jaws 9, 10. By this structure jaws 9, 10 are supported for movement through rotation of stud 12 toward and away from each other. Any tendency of jaws 9, 10 to bend or cock is prevented by the slidable support provided by rod 22.

As best seen FIG. 17 the support 15 is provided with a bore 25 between stud 12 and rod 22 and said bore is formed with its axis parallel to and centrally between the clamping jaws 9, 10. A bushing 26 may be received within said bore 25 for rotatably supporting the stem 27 of a boring bit generally designated 29 (FIGS. 1, 17). The bore 25 is enlarged as at 28 adjacent the inner end of support 15 that is nearer the edge 3 of the door for accommodating the enlarged screw portion 30 of bit 29. However, the actual guiding of bit 29 is performed by bushing 26 which rotatably supports the stem 27 of bit 29 and no actual guiding of the screw portion 30 is therefore required.

The clamping jaws 9, 10 are provided adjacent their ends opposite support 15 with relatively large holes 35, 36 respectively (FIG. 1) which are adapted to receive therethrough the cutting head 37 of a boring bit generally designated 38. When jaws 9, 10 are clamped to the door 1 as indicated in FIG. 1 the head 37 of bit 38 is adapted to penetrate door 1 to form the relatively large bore 4 while the bit 29 is adapted to bore the small bore 2 (FIG. 1).

For the purpose of supporting and guiding the large bit 38 an integral extension 41 is provided on the clamping jaw support 15. This extension 41 extends alongside clamping jaw 9 and is provided at its free end with a boss 42 through which is drilled a hole 43 at right angles to the planes of the clamping jaws 9, 10. A bushing 44 is received within hole 43 for rotatably supporting the stem 46 of bit 38.

It should be noted at this point that an important advantage of the present invention resides in the fact that supports for both boring bits 29, 38 are carried by one member, namely support 15. In other words, there are no screw connections or the like connecting one bit support with another separate bit support such as would permit shifting between the bit supports. In other words, the bores 2, 4 in door 1 must remain in correct perpendicularly extending relation because the supports for the respective bits are integrally connected together. Furthermore, the connection between clamping jaws 9, 10 and support 15, that is, stud 12 and rod 22, is such that bore 2 is formed exactly parallel to and centrally between the opposite faces 5, 6 of door 1.

As is well known, there is a tendency for wood to splinter on the side from which a boring bit emerges. To prevent such splintering the jaw 10 of the present invention is formed with an annular ridge 48 (FIG. 1) on its inner face 50 adjacent the hole 36. This ridge 48 converges to a cutting edge which is embedded in door 1 when jaws 9, 10 are clamped to the door by means of stud 17. Clamping jaw 9 may also be provided with a similar ridge but this is not necessary since there is little likelihood of splintering at the side of the door which the bit enters.

The presence of ridge 48, however, enhances the possibility of the clamping jaw 10 scratching or cutting the face 6 of the door as the jig is installed in place. Both faces 5, 6 are subject to being marred by the adjacent clamping jaw as the jig is set in place but the sharpened ridge 48 or jaw 10 increases the likelihood of such damage. In order to protect the door against any injury the portions of the inner faces 49, 50 of jaws 9, 10 that engage faces 5, 6 of door 1 are each provided with a layer of resilient flexible material such as rubber as indicated at 53, 54 (FIG. 1). These layers 53, 54 may be secured to the inner faces 49, 50 of jaws 9, 10 by any suitable adhesive. Layer 54 on jaw 10 should be of a thickness at least equal to or preferably slightly greater than the depth of ridge 48 so as to prevent any portion of the jaws from engaging door 1. Of course, as clamping pressure is applied the layer 54 is compressed permitting ridge 48 to cut into the face 6 of the door 1. When the clamping pressure is removed the layer 54 is permitted to expand and protect the door against marring during withdrawal of the jig.

By the above described structure the fibers surrounding bore 4 on face 6 are severed thereby preventing splintering as the bit 38 emerges from face 6. In addition, the door is effectively guarded against scratching or cutting during installation or removal of the boring jig.

It will be understood that success of the present invention is to some degree dependent upon the jaws 9, 10 being evenly applied to the faces 5, 6 of door 1. If the jaws are cocked relative to the faces the ridge 48 may not cut all around the bore 4 thus reducing the effectiveness of said ridge.

In order to insure uniform cutting of the door all around bore 4 a ring 61 may be employed on jaw 10 as illustrated in FIGS. 13, 14, wherein a jaw 60 is shown which is similar in function to jaw 10 of FIG. 1. A relatively large bore 59 is formed in jaw 10 to receive therein ring 61 which is provided adjacent its upper and lower sides with journals 62, 63 pivotally received in complementarily formed slots 64, 65 in face 66 of clamping jaw 60. Slots 64, 65 are positioned so that ring 61 is swingable about journals 62, 63 and is concentric with bore 62 in jaw 60.

In order to retain journals 62, 63 in slots 64, 65 upper and lower holes 67, 68 (FIG. 13) are drilled from the free end of clamping jaw 60 into said slots 64, 65 respectively and balls 69, 70 are inserted in said holes and held against journals 62, 63 respectively by means of springs 71, 72. Plugs 73, 74 are inserted in holes 67, 68 to retain said springs in place.

Pivoted ring 61 is provided with an annular ridge 77 adapted to cut into the face of the door in like manner as ridge 48 (FIG. 1) and is provided with a central circular opening 78 adapted to receive therein the same bit 38 shown in FIG. 1.

By the structure of FIGS. 13, 14 it will be apparent that the ridge 77 will cut into the door in a uniform manner around its periphery because the ring 61 is free to swing about an axis through journals 62, 63 to accommodate itself to misalignments of either the boring jig or the door on which it is installed.

In some cases it is desirable to provide means for boring holes of different sizes especially to accommodate different sizes of latch bolt retractor mechanisms. In other words, the size of hole 4 which extends between the opposite faces 5, 6 of the door may vary with locks of different types. Preferably two sizes should be provided for.

This object may be achieved by the structure shown in FIGS. 15, 16 wherein the clamping jaw is provided with a relatively large opening 81 to receive a ring 83 similar in function to ring 61 of FIGS. 13, 14. Jaw 80 is provided with a radially inwardly projecting annular shoulder 84 on the side of said jaw opposite the door engaging face 85 that carries the layer 86 of yieldable material.

Shoulder 84 is adapted to abut an annular enlarged portion 88 on ring 83 for resisting the clamping force transmitted to said ring. Ring 83 is provided with one bore 89 to accommodate a bit of one size and another bore 90 to accommodate a larger size of bit. An annular ridge or cutting edge 91 is provided adjacent bore 89 and a similar ridge 92 adjacent bore 90 for the purpose hereinbefore described.

Ring 83 is retained in jaw 80 by means of a pair of balls 95, 96 received within drilled holes 97, 98 extending inwardly from opposite sides of jaw 80. Springs 99, 100 are employed to urge said balls into complementarily formed depressions 101, 102 in the enlarged portion 88 of ring 83. Plugs 104, 103 in holes 97, 98 serve as retainers for springs 99, 100.

By the above described structure ring 83 may be installed in jaw 80 as shown in FIG. 16 or may be withdrawn against the yieldable resistance of springs 99, 100 and reinstalled in a reverse manner with ridge 92 of bore 90 adjacent clamping face 85. In either case springs 99, 100 acting through balls 95, 96 retain the ring against accidental removal and shoulder 84 resists the clamping forces applied to said ring. The boring jig may thus be employed for boring holes of two different sizes.

Referring again to FIG. 1 the operation of the jig is the same regardless of which of the above described forms is employed. The boring bits 29, 38 may be inserted into their respective bushings 26, 44 stems first so that the entire assembly, including the bits, may be clamped to the door at the desired height from the floor with the clamping jaw support 15 in engagement with the side edge 3 of the door 1. It is then merely necessary to attach a portable power drill or manually operated brace to the bits and successively bore the holes, 2, 4 in the door 1.

In order to limit inward movement of each bit 29, 38 it is preferable to provide an annular groove adjacent the outer end thereof for receiving snap rings 107, 108 therein. In this manner said snap rings 107, 108 engage bushings 26, 44 respectively preventing farther inward movement of the bits after the desired depth of cut has been achieved. In this connection it will be noted that bore 2

(FIG. 1) should extend a slight distance beyond bore 4 in the door 1. By providing snap ring 107 on bit stem 27 further rotation of bit 29 after the desired depth of bore has been achieved results in the threads formed in the wood being stripped so that the bit 29 may be readily withdrawn.

After both bits have been withdrawn from the door the boring jig may be removed by rotating stud 12 and the user may proceed to the next door and repeat the operation.

It is preferable to provide means for holding the bits 29, 38 in their retracted positions so that they do not advance toward the door during installation or removal of the jig and cause damage to the finished surface of the door. This is particularly true in the case of the large bit for forming bore 4 since said bit is likely to scratch or cut face 5 of the door as the jig is moved to its clamping position. Some methods of retaining the bits in retracted position are shown in FIGS. 9–12.

In FIG. 9 the stem 111 of bit 110 is provided with an annular ridge 112 adjacent the cutting head 113 of the bit. The boss 114, which corresponds to boss 42 on extension 41 of FIG. 1 is provided adjacent its inner end with an expansible split ring 115 retained in a groove 116 by means of a suitable retainer 117. Upon withdrawal of bit 110 the ring 115 snaps over the ridge 112 and yieldably holds the bit 110 against movement away from boss 114. When it is desired to start boring with bit 110 it is merely necessary to push inwardly on stem 111 and the ridge 112 is released from ring 115.

In FIG. 12 another somewhat similar form is shown except in this case the stem 120 is provided with an annular groove 121. An expansible split ring 122 is retained relative to boss 123 by means of a head 124 that is secured to boss 123 by pins 125.

The bit may also be retained in its retracted position magnetically as shown in FIGS. 10, 11. In FIG. 10 a cylindrical magnet 127 is secured within a suitable recess in boss 128 so that upon retraction of the bit 129 from the door the bit is held against magnet 127 until pushed away by the operator. A somewhat similar arrangement is shown in FIG. 11 except that a ring type magnet 131 is attached to boss 132.

Referring again to FIGS. 1, 17 it will be apparent that the backset of the lock, that is, the distance from the door engaging face 135 of support 15 to the axis of bit 38, is maintained uniform for all doors bored provided said face 135 is brought into engagement with the edge 3 of the door before the jig is clamped in place.

However, it is sometimes desirable to increase the backset in order, for example, to accommodate a relatively large escutcheon plate. In such a case the length of the clamping jaws should be increased and also the length of the extension on the clamping jaw support.

FIGS. 4, 6 illustrate one modified form of the invention for adapting the use of the boring jig to locks having different backsets.

FIG. 4 is a perspective of a boring jig similar to that shown in FIGS. 1–3 and 17. A pair of clamping jaws 136, 137 are carried by a supporting stud 138 on a support 139 which is provided with an extension 140 on the free end of which is a boss 141 for guiding the large bit through the door and through holes 142, 143 in jaws 136, 137 respectively.

The above noted structure is substantially the same as the structure of FIGS. 1–3 except that the distance between the door engaging face 144 of support 139 and the central axis of holes 142, 143 is increased to provide a long backset.

In order to adapt the device to a standard backset a pair of spacers 145, 146 are pivotally secured to the upper and lower sides respectively of the support 139 (FIG. 6) by means of pins 147. When the spacers 145, 146 are in the position of FIG. 6 an extra long backset is provided for and if it is desired to adapt the boring jig to a door having a standard backset it is merely necessary to swing the spacers 145, 146 to the position of FIG. 4 wherein they are interposed between the support 139 and the door.

Another form of adjustable backset is shown in FIGS. 7, 8. In this case the jaw support 150 is provided with a sheet metal cover generally designated 151 which is held in a position against the front face 152 of support 150 by ears 153 which are bent inwardly so as to be received within recesses 154 formed in the top and bottom faces of support 150. Extensions 155 project upwardly and outwardly from support 150 and may be swung outwardly against the natural resiliency of cover 151 so as to remove ears 153 from recesses 154. The cover may then be shifted to the outer position shown in dot-dash lines in FIG. 8 to permit ears 153 to enter another pair of recesses 156.

When the cover 151 is in the inner full line position of FIG. 8 the jig is ready for use in boring for a long backset, whereas when the cover is in the projected dot-dash line position of FIG. 8 it can be used for a standard backset.

It is also desirable to provide a height line rod 160 which is provided with an offset portion 161 for extending over the top edge of the door so that the weight of the jig may be taken by rod 160 during installation. The lower end of rod 160 is flattened as seen in FIGS. 4, 5 and is received in a vertically opening recess 162 formed in jaw 137. A pin 163 extends through rod 160 for pivotally supporting the rod 160 at its lower end. A flat spring 165 (FIG. 5) is provided in recess 162 so as to be deflected when said lower end is inserted in the recess 162. An L-shaped slot 166 formed in rod 160 is adapted to receive therein the pin 163 so that the resiliency of spring 165 retains the rod in the recess but permits removal of the rod when desired.

The above described structure permits the height line rod to take the weight of the jig as the latter is being installed and removed.

The very specific description herein given of the invention and modifications thereof is not to be taken as restrictive thereof as it is obvious that various modifications may be resorted to without departing from the spirit of the invention as defined in the following claims.

I claim:

1. A boring jig for use on a door having a pair of opposite faces and a side edge comprising: a pair of opposed clamping jaws adapted to engage said opposite faces, a support on which said jaws are mounted, and means carried by said support for adjustably moving said jaws relative to said support and toward and away from each other, first guide means formed on said support for guiding a bit entering said edge parallel to said faces, and second guide means carried by said support and fixed relative to said first guide means for guiding a bit disposed at right angles to said faces.

2. A boring jig for use on a door having a pair of opposite faces and a side edge comprising: a pair of opposed clamping jaws adapted to engage said opposite faces, a support on which said jaws are mounted, and means carried by said support for adjustably moving said jaws relative to said support and toward and away from each other, first guide means formed on said support for guiding a bit entering said edge parallel to said faces, and second guide means carried by said support for guiding a bit disposed at right angles to said faces, said support comprising a block adapted to engage said edge, and said second guide means being integral with said block and fixed relative to said first guide means.

3. A boring jig for use on a door having a pair of opposite faces and a side edge comprising: a pair of opposed clamping jaws adapted to engage said opposite faces in clamping relation therewith, said jaws each being provided with a relatively large hole for receiving a first boring bit therethrough, a block interposed between said jaws, means carried by said block for adjustably moving said jaws toward and away from each other, said block being provided with a bearing hole adapted to rotatably support therein the shank of a second boring bit with said shank parallel to said faces, an extension integral with said block and extending alongside one of said jaws, said extension being provided with a hole for rotatably supporting therein the shank of said first boring bit, adjustable spacer means carried by said block for spacing said block from said edge for varying the distance between said large holes and said edge, said last mentioned means being swingably supported on said block for swinging to a position out of spacing relation with said block.

4. In a jig for facilitating boring through a member having a pair of opposed faces, a pair of clamping jaws, means for moving said jaws relatively toward each other with the inner opposed sides of said jaws engaging the opposite faces of said member and in clamping relationship therewith, the one of said jaws adjacent the face through which said bit enters said member being provided with an opening for receiving said bit therethrough, the other of said jaws being provided with an element swingably supported for oscillation relative to said other jaw, said element being provided with an opening for receiving said bit therethrough.

5. A boring jig for use on a door having a pair of opposite faces and a side edge comprising: a pair of opposed clamping jaws adapted to engage said opposite faces, a support on which said jaws are mounted, and means carried by said support for adjustably moving said jaws toward and away from each other, first guide means formed on said support for guiding a bit entering said edge parallel to said faces, and second guide means carried by said support for guiding a bit disposed at right angles to said faces, adjustable spacer means carried by said jig for spacing said support from said edge for varying the distance between said large holes and said edge, said spacer means comprising a generally U-shaped slide slidably supported on opposite faces of said support for movement toward and away from said edge, and stop means on one of said faces for holding said slide in a position spaced from said edge.

6. In a jig for guiding a bit having a head and a stem, said jig being provided with a guide hole for receiving the stem of said bit therethrough and for guiding said bit along the central axes of said hole, holding means on said jig for holding said bit in a predetermined position relative to said jig, said holding means exerting a predetermined holding effort on said bit whereby the latter may be released from said holding means by exerting an axially directed force in a direction to move said head away from said jig.

7. In a jig for guiding a bit having a head and a stem, said jig being provided with a guide hole for receiving the stem of said bit therethrough and for guiding said bit along the central axes of said hole, holding means on said jig for holding said bit in a predetermined position with said head adjacent said jig, said holding means exerting a predetermined holding effort on said bit whereby the latter may be released from said holding means by exerting an axially directed force in a direction to move said head away from said jig, said holding means comprising interengaging elements on said bit and said jig releasably secured together.

8. In a jig for guiding a bit having a head and a stem, said jig being provided with a guide hole for receiving the stem of said bit therethrough and for guiding said bit along the central axes of said hole, holding means on said jig for holding said bit in a predetermined position with said head adjacent said jig, said holding means exerting a predetermined holding effort on said bit whereby the latter may be released from said holding means by exerting an axially directed force in a direction to move said head away from said jig, said holding means comprising a magnet adjacent said one end of said jig for magnetically holding said head.

References Cited in the file of this patent
UNITED STATES PATENTS

| | | |
|---|---|---|
| 606,549 | Holmes | June 28, 1898 |
| 1,590,643 | Neuwelt | June 29, 1926 |
| 2,886,989 | McCuen | May 19, 1949 |